United States Patent
Shehan et al.

[11] Patent Number: 6,043,737
[45] Date of Patent: Mar. 28, 2000

[54] TIRE MONITORING AND DEFLATION WARNING ASSEMBLY

[76] Inventors: Mark Alan Shehan, 5534 Redbud Ct., Ypsilanti, Mich. 48197; Dale Scott Crombez, 9615 Ingram, Livonia, Mich. 48150; Patrick Joseph Curran, 28897 Augusta, Farmington Hills, Mich. 48331; Kevin Michael Bullister, 4885 Mathew Ct., Ypsilanti, Mich. 48197

[21] Appl. No.: 09/346,950

[22] Filed: Jul. 1, 1999

[51] Int. Cl.[7] ................................................ B60C 23/00
[52] U.S. Cl. ................ 340/442; 340/440; 340/444; 340/443; 73/146.2; 73/146.3; 73/146.5
[58] Field of Search ..................... 340/442, 440, 340/444, 443; 73/146.2, 146.3, 146.5

[56] References Cited

U.S. PATENT DOCUMENTS

| | | |
|---|---|---|
| 4,277,772 | 7/1981 | Kastura et al. . |
| 4,447,801 | 5/1984 | Masuda . |
| 4,876,528 | 10/1989 | Walker et al. ........................ 340/442 |
| 4,906,970 | 3/1990 | Momura . |
| 5,179,981 | 1/1993 | Hicks et al. . |
| 5,218,862 | 6/1993 | Hurrell, II et al. ..................... 73/146.5 |
| 5,524,482 | 6/1996 | Kushumoto et al. ................... 73/146.3 |
| 5,569,848 | 10/1996 | Sharp ..................................... 73/146.2 |
| 5,578,984 | 11/1996 | Nakajima ................................ 340/444 |
| 5,591,906 | 1/1997 | Okawa et al. ......................... 73/146.5 |
| 5,604,307 | 2/1997 | Iida et al. .............................. 73/146.2 |
| 5,721,374 | 2/1998 | Siekkinen et al. .................... 73/146.2 |
| 5,721,528 | 2/1998 | Boesch et al. . |
| 5,844,475 | 12/1998 | Horie . |

*Primary Examiner*—Jeffery A. Hofsass
*Assistant Examiner*—Tai T. Nguyen
*Attorney, Agent, or Firm*—Chupa & Alberti, P.C.

[57] ABSTRACT

A tire monitoring and warning assembly 10 which monitors and measures attributes or characteristics of at least one of the selectively inflatable tires 14–20 of a vehicle 12 and which compares the obtained measurements with a stored value which represents a value of the attribute or characteristic occurring or existing when the at least one tire 14–20 is desirably inflated, and which, based upon the comparison, warns the driver if the at least one of the tires 14–20 is deflated.

10 Claims, 2 Drawing Sheets

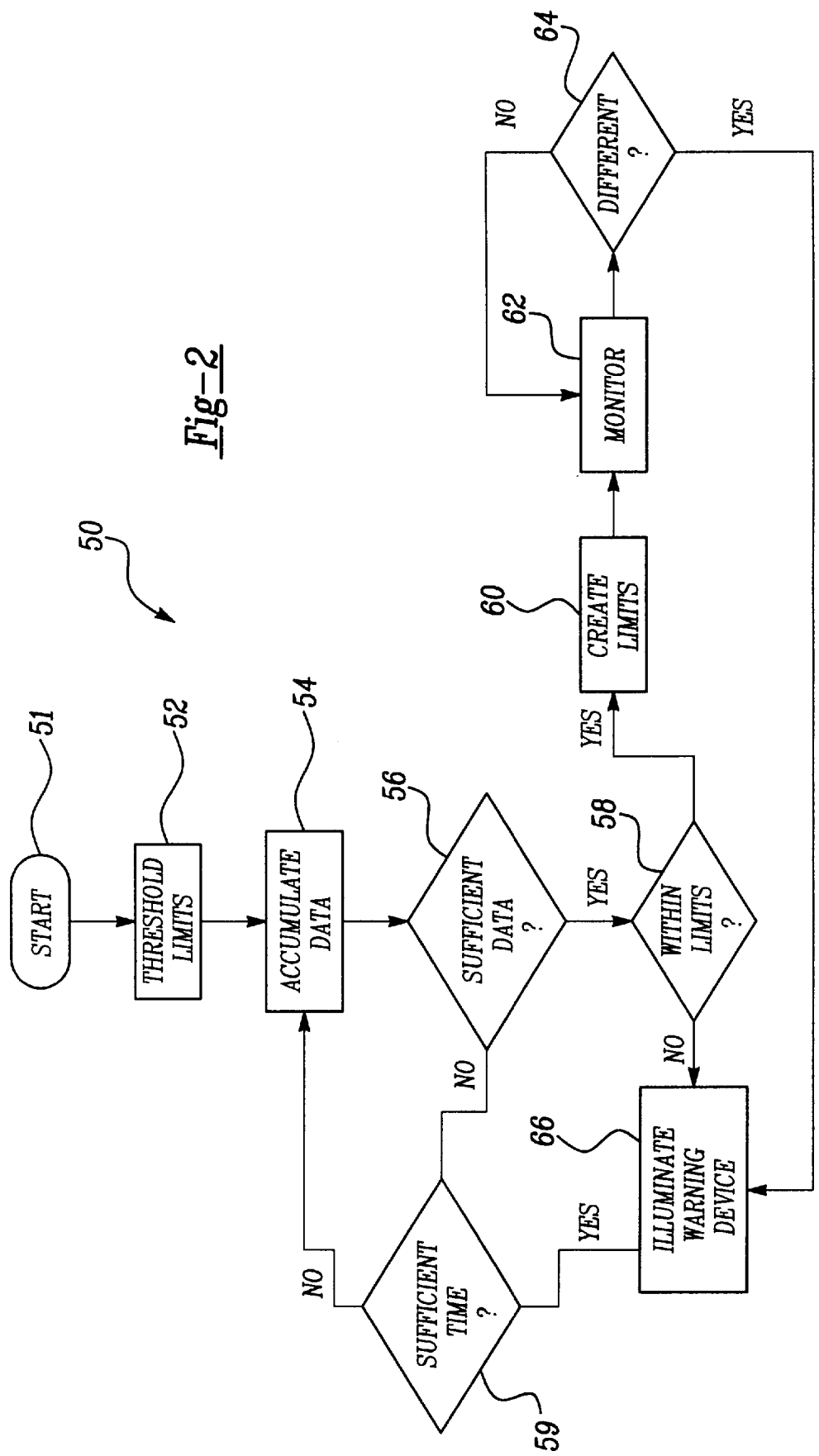

TIRE MONITORING AND DEFLATION WARNING ASSEMBLY

FIELD OF THE INVENTION

This invention relates to a tire monitoring and warning assembly and more particularly, to a tire monitoring and deflation warning assembly which selectively monitors at least one tire of a vehicle and which provides an indication of a loss of pressure within the at least one tire based upon the use of a value which is produced by measuring an attribute of the at least one tire when the at least one tire is properly and desirably inflated.

BACKGROUND

Tire monitoring and warning assemblies are normally and operatively employed upon and/or within vehicles to selectively measure an attribute of the vehicle tires and, based upon the measurements, to determine whether one or more of the tires has lost pressure or has "deflated", and to selectively energize a warning device, such as a lamp or alarm, to notify the driver and/or vehicle occupants of the undesirable tire deflation.

While these tire monitoring and warning assemblies do oftentimes provide desired and relatively accurate warning indications, they suffer from some drawbacks. For example, each of these assemblies typically utilizes a separate and initially created "learned" attribute value for each of the monitored tires. Particularly, each of these values typically arises from and/or is based upon a measurement of an attribute or characteristic of a unique one of the monitored tires. The tire monitoring/warning assembly then, as the vehicle is driven, periodically measures each tire attribute and compares each of the measured or "monitored" values with a unique one of the initial or "learned" values. Particularly, "learned" values and monitored values corresponding to the same tire are compared. Substantial differences between any initial attribute value and the respective and corresponding periodic measured values cause the tire assembly to selectively energize a deflation warning device, effective to notify the user and/or operator of the vehicle that one or more of the monitored tires is undesirably deflated. It is therefore important, in these systems, that the respective initial tire attribute values be created from measurements which are made when the tires are actually and desirably inflated, since these initial values cooperatively represent the "benchmark" or "standard" which is used to later determine undesirable tire deflation. Hence, if the "benchmark" is incorrect, then so will be the entire monitoring and warning system.

These prior tire monitoring and warning systems typically include a selectively depressible "learn", reset, or "standardization" switch which allows a vehicle driver/user to selectively cause the tire monitoring and warning assembly to create new initial or "learned" values in order to allow new tires to selectively replace the tires which have been previously monitored. This switch also typically and selectively de-energizes or "resets" the warning device.

Oftentimes, the vehicle driver/user or other occupants (e.g., children) inadvertently cause these initial "learned" values to be created when the new tires have not been fully inflated, thereby causing the creation of errant "learned" values which prevent the system from accurately warning the driver/user of deflated tires. Moreover, many vehicle driver/owners, in order to de-energize the warning device, simply depress the "reset" switch, thereby undesirably and perhaps unknowingly causing the system to create one or more errant initial "learned" values associated with and/or based upon one or more deflated or partially deflated tires which are presently causing the warning light or device to be selectively energized.

There is therefore a need for an improved tire monitoring and/or deflation warning assembly which allows initial or "learn" values to be operatively created only when the tires are properly and desirably inflated. There is a further need for a "reset" switch which reduces the probability of the undesired and errant creation of initial or "learn" values. These and other needs are addressed by the inventions set forth in this Application for patent.

SUMMARY OF THE INVENTION

It is a first object of the present invention to provide a tire monitoring and deflation warning system which overcomes some or all of the drawbacks associated with prior tire monitoring and warning systems.

It is a second object of the invention to provide a tire monitoring and deflation warning system which overcomes some or all of the previously delineated drawbacks associated with prior systems and which allows a new "learn" value or initial value to be selectively and operatively created based upon proper or "approved" tires which are properly and desirably inflated.

It is a third object of the invention to provide a tire monitoring assembly which overcomes the various drawbacks associated with prior tire monitoring assemblies and which includes a selectively depressible multi-function "standardization" switch which selectively causes a first function or operation to be accomplished (i.e., traction control) when it is momentarily depressed and released, and which produces or causes a "standardization" to occur and the warning device to be selectively "reset" or de-energized when it is depressed for a predetermined period of time.

According to a first aspect of the invention, a tire monitoring assembly is provided for use with a vehicle having at least one selectively inflatable tire having a measurable attribute of a certain value when the at least one tire is inflated. The tire monitoring assembly includes a controller which initially measures the attribute, which produces a first value based upon the measurement, and which operably utilizes the first value to determine whether the at least one tire is deflated only if the first value is substantially identical to the certain value, thereby improving the accuracy of the determination.

According to a second aspect of the present invention, a method for improving the accuracy of a tire monitoring system is provided. The tire monitoring system is used in combination with a vehicle having at least one selectively inflatable tire having a measurable characteristic of a certain value when the at least one tire is inflated. The tire monitoring system initially measures the characteristic and produces a second value based upon the measurement. The tire monitoring system further and periodically measures the characteristic and produces third values based upon these periodic measurements and selectively produces a tire deflation signal when at least one of the produced third values differs from the second value. The method includes the steps of comparing the second value to the certain value; providing a selectively energizable warning device; causing the tire monitoring assembly, based upon the comparison of the second value to the certain value, to selectively discard the second value, thereby selectively preventing the comparison of the second value with the third values from being made; and selectively energizing the warning devices, thereby improving the accuracy of the tire monitoring system.

These and other objects, features, and advantages of the invention will become apparent from a reading of the following description and by reference to the following drawings.

BRIEF DESCRIPTION OF THE DRAWINGS

FIG. 2 is a flow chart illustrating the operation of the controller shown in FIG. 1.

DETAILED DESCRIPTION OF THE PREFERRED EMBODIMENT

Figure 1:
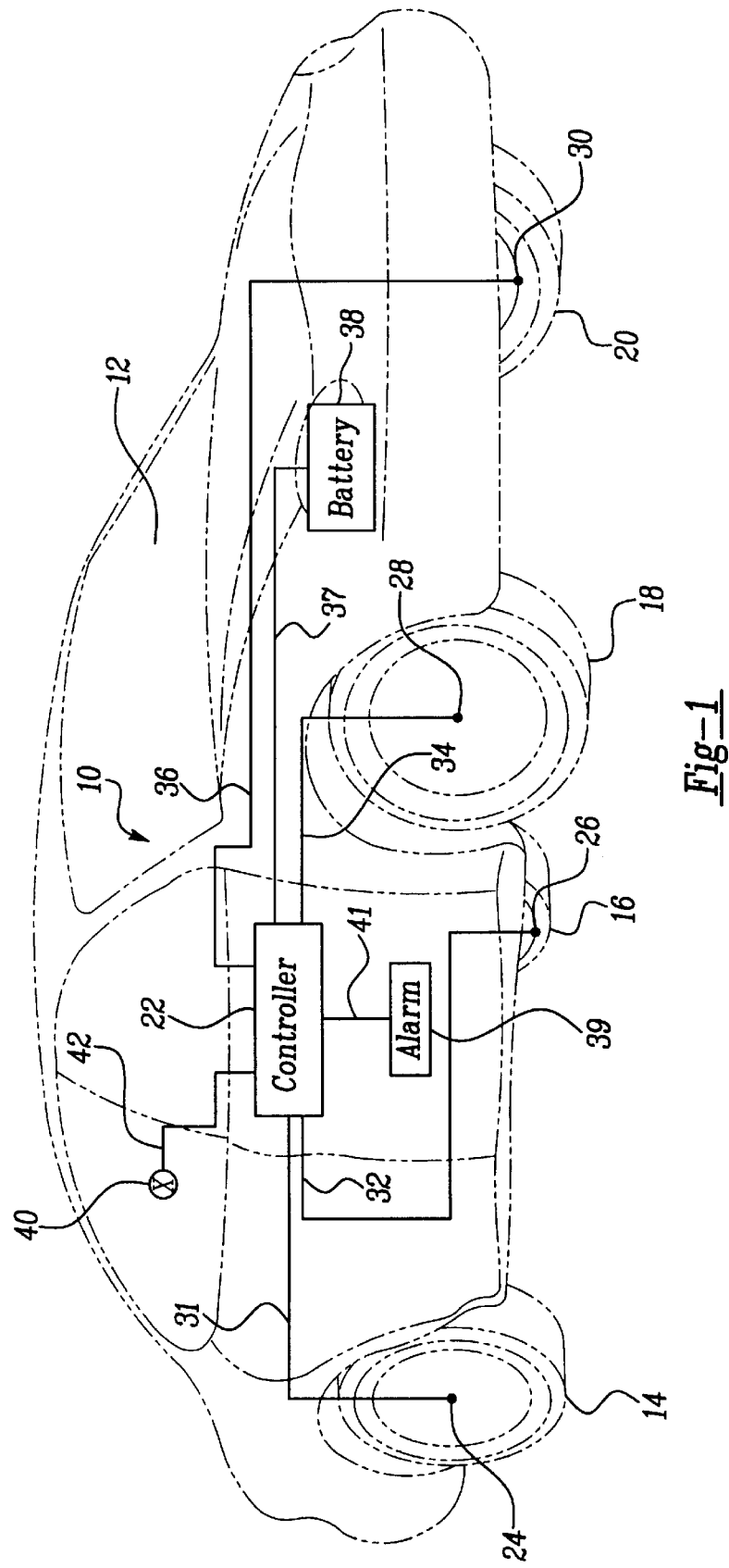
FIG. 1 is a block diagram of a tire monitoring and deflation warning assembly, operatively deployed within a vehicle and made in accordance with the teachings of the preferred embodiment of the invention.

Referring now to FIG. 1, there is shown a tire monitoring and deflation warning assembly 10 which is made in accordance with the teachings of the preferred embodiment of the invention and which is operatively deployed within and/or upon a typical and conventional vehicle 12 having several selectively inflatable tires 14, 16, 18, and 20 which are selectively and operably deployed upon the vehicle 12 and which cooperatively allow the vehicle 12 to be selectively moved or driven.

Assembly 10 includes a controller 22, such as a commercially available microprocessor, deployed upon and/or within vehicle 12, operating under stored program control, and operatively and communicatively coupled to tire sensing devices 24, 26, 28, and 30 which are respectively and operatively deployed within and/or upon tires 14, 16, 18, 20 and which measure a respective attribute or characteristic of one of the respective tires 14, 16, 18, and 20.

In one non-limiting embodiment of the invention, each of the sensor devices 24–30 measures the pressure within a unique one of the respective tires 14–20. In a second non-limiting embodiment of the invention, each of the sensor devices 24–30 measures the turning radius of a unique one of the respective tires 14–20. These measured tire attributes and/or characteristics (e.g., "pressure" or "turning radius") are communicated to controller 22, by selective use of respective busses 31, 32, 34, and 36, and are operatively and selectively used, by controller 22, to determine whether the tires 14–20 are deflated or have undesirably lost a certain amount of pressure. Controller 22 is also physically and electrically coupled to a conventional vehicle battery 38 by bus 37. Battery 38 provides electrical power to the controller 22 and controller 22 selectively and operatively causes the provided electrical power to be coupled to the warning device (e.g., a light or alarm) 39 by bus 41 in order to selectively energize the device 39.

Particularly, these measured tire attributes or characteristics are used by controller 22 to determine whether one or more of the tires 14–20 are undesirably deflated. That is, it is generally known that an undesirably deflated tire 14–20 will have a lower tire pressure and a lower turning radius than it had when it was desirably inflated. Hence, by measuring these tire attributes or characteristics (e.g., "pressure" and/or "turning radius"), for each tire 14–20, and then comparing these measured attribute values with the respectively corresponding "inflated" attribute value, a separate determination may be made of whether each of the tires 14–20 is desirably inflated.

Assembly 10 also includes a selectively depressible "standardization" switch 40 which is coupled to controller 22 by bus 42 and which causes the controller 22 to selectively "learn" or measure one or more of the attributes or characteristics associated with one or more of the tires 14–20 and to create respective attribute "learn" values for each tire 14–20 based upon these measurements. These values are then used as a "benchmark" to determine whether the tires 14–20 later become deflated.

In the preferred embodiment of the invention, switch 40 is a momentary contact switch which selectively causes controller 22 to control various portions of vehicle 12 or to accomplish certain functions (i.e., traction control) by being momentarily depressed or actuated and then released. Switch 40 further, in this non-limiting embodiment, if continually depressed for a time exceeding ten seconds (other time intervals may be used), represents a "standardization command" which causes controller 22 to begin a "standardization routine". Hence, the manner in which the "standardization" command is generated is not readily apparent and, in fact, is "obscured" from the view of a child or other occupants, thereby decreasing the probability that an undesired "standardization" will occur. In one non-limiting embodiment, the generation of the "standardization" command will also reset or de-energize warning device 39. The operation of assembly 10 will now be discussed in greater detail with reference to flowchart 50 of FIG. 2. It should be realized that while a single attribute is used within flowchart 50, multiple attributes or tire characteristics may be separately and cooperatively used in a substantially similar manner.

As shown, in step 51, a "learn" routine begins after a "standardization" command is initially received by controller 22 (e.g., after switch 40 has been continually depressed for some predetermined period of time). An initial threshold limit value "window" or a single characteristic value is then obtained and/or "fixed" in step 52 for each of the tires 14–20.

Particularly, in the preferred embodiment of the invention, each of these single characteristic values are substantially equal. Similarly, in one embodiment of the invention where tires 14–20 are substantially similar, each of the value windows are substantially equal and have a first upper and a second lower pressure or turning radius value associated with and/or based upon properly inflated tires which are "approved" for use, by the vehicle manufacturer, upon vehicle 12. Particularly, these upper and lower limit values may be selectively stored within the controller 22, for each one of the many different types or models of tires 14–20 which are "allowed" or "approved" by the vehicle manufacturer, for use upon vehicle 12. These values are typically published or provided by the tire manufacturers. A portion of this stored data is used within step 52 based upon certain information provided by the user (e.g., the portion of the stored data corresponding to the model of the tires 14–20 which are currently and actually used by the vehicle 12). Hence, each tire 14–20 has a value window corresponding to its respective and acceptable range of pressure or turning radius values provided by the tire manufacturer. Alternatively, each window may be defined by estimated values or limits associated with the properly inflated pressure or turning radius values of most approved tires, or by a first low value calculated from or based upon the mathematical average of each of the lowest acceptable pressures or turning radii of each model of tire which may be used upon vehicle 12, and a second high value calculated from or based upon the mathematical average of each of the highest acceptable pressures or turning radii for all or some of these "approved" tires. Moreover, each of the single characteristic values, for each tire 14–20, may represent an average value of the highest and lowest respective and allowable pressure or turning radius for the tires 14–20.

Step 54 follows step 52 and, in this step, controller 22 begins to periodically acquire characteristic or attribute data from each of the respective tires 14–20 (e.g., from each of the respective sensors 24–30) for the purpose of utilizing this acquired or "learned" "benchmark" data in order to later determine whether the tires 14–20 have become deflated. Hence, step 54 represents a "standardization" data acquisition process. Step 56 follows step 54 and, in this step, controller 22 determines whether the desired characteristic or attribute "benchmark" data has been acquired for each of the tires 14–20.

If sufficient characteristic/attribute data has been acquired, step 56 is followed by step 58 in which the recently acquired tire characteristic and/or tire attribute data is compared with the respective tire characteristic or attribute values or limits of step 52. That is, the data acquired for tire 14 in step 54 is compared with the single characteristic value or the value window of tire 14 which was created in step 52. Similarly, the acquired data for each of the other tires 16–20 is also separately and similarly compared to the respective tire value window or characteristic value which was created in step 52.

Alternatively, step 56 is followed by step 59 in which controller 22 determines whether sufficient time and/or driving distance has passed since the step 52 was completed. In one non-limiting embodiment, this time/distance "limit" is programmable. If sufficient time or distance has not yet "passed", step 59 is followed by step 54. Alternatively, step 59 is followed by step 66 in which device 39 is energized to indicate that the attempted "standardization" has failed.

If the acquired "benchmark" data, for each tire 14–20, resides within the respective range created within step 52 (e.g., the acquired data associated with tire 14 resides within the value window associated with tire 14 or is equal to the single characteristic value of tire 14, while the acquired data associated with tire 16 resides within the value window associated with tire 16 or is equal to the single characteristic value of tire 16 and the acquired data associated with tires 18, 20 similarly resides within the respective value windows or is equal to the respective single characteristic value of tires 18, 20), step 58 is followed by step 60. In step 60, controller 22 utilizes the acquired data from step 54 and creates a certain "standardized"/benchmark window for each tire 14–20. Alternatively, step 58 is followed by step 66 which requires controller 22 to energize warning device 39, thereby informing the vehicle driver and/or user of undesired tire deflation or the use of improper tires 14–20 which cause a "standardization" failure.

Each "benchmark window", created within step 60, may comprise a single value residing within a respective one of the value windows of step 52 or may selectively equal a unique and respective one of the single characteristic values obtained within step 52. Moreover, in another non-limiting embodiment, the average of all or substantially all of the data acquired in step 56 for a tire 14–20 is used as the "benchmark" for that tire 14–20.

Particularly, each of these "benchmark windows" or "benchmark values" respectively defines a single acceptable value or a range of acceptable values. Step 62 follows step 60 and, in this step, controller 22, by use of sensors 24–30, periodically monitors or measures the respective attribute or characteristic of each of the tires 14–20. Step 64 follows step 62 and, in this step, controller 22 determines whether the respectively measured tire characteristics or attributes of each tire 14–20 has a measured value which is different from the respective "benchmark window" or value which was created within step 60 (e.g., whether the measured value for a tire 14–20 resides outside of the respective range or differs from the respective single characteristic value of that tire 14–20). If the measured value is different and/or substantially different from the respective benchmark window or value (e.g., the amount of the undesired difference may be programmably defined by controller 22), step 64 is followed by step 66 in which a warning device 39 is selectively energized. Alternatively, step 64 is followed by step 62.

In this manner, as should be appreciated, assembly 22 substantially ensures that an operator/user of the vehicle is correctly warned, in a timely manner, of a deflated tire 14–20 and that the value used as the "benchmark" (or the "benchmark window") which is compared to the monitored attribute values correctly represents and/or is based upon a measurement made of properly inflated and approved tires 14–20.

It should be understood that the inventions described herein are provided by way of example only and that numerous changes, alterations, modifications, and substitutions may be made without departing from the spirit and scope of the inventions as delineated within the following claims.

What is claimed is:

1. A tire monitoring assembly for use with a vehicle having at least one selectively inflatable tire, said tire having a measurable attribute of a certain predetermined inflation value when said tire is inflated, the tire monitoring assembly comprising:

a controller which initially measures said attribute and which produces a first value based upon said measurement and which operably utilizes said first value to determine whether said at least one tire is deflated, only if said first value is substantially identical to said certain value.

2. The tire monitoring assembly of claim 1 further comprising a selectively depressible switch which is coupled to said controller and which causes said controller to produce said first value when said switch is selectively depressed for a certain predetermined amount of time.

3. The tire monitoring assembly of claim 1 wherein said attribute comprises pressure.

4. The tire monitoring assembly of claim 1 wherein said attribute comprises a tire turning radius.

5. The tire monitoring assembly of claim 1 wherein said monitoring assembly further comprises a selectively energizable device which is coupled to said controller and which is energized when said at least one tire is deflated.

6. The tire monitoring assembly of claim 2 wherein said switch causes said controller to perform a certain action when said switch is momentarily depressed.

7. The tire monitoring assembly of claim 1 wherein said controller operably utilizes said first value to create a value range for said at least one tire.

8. A tire monitoring assembly for use in combination with a vehicle having at least one selectively inflatable tire, said tire assembly comprising a controller which uses data to produce a certain value window and a measured first value, said controller selectively using said first value to determine whether said at least one tire is deflated only after said controller first determines whether said first value resides within said certain value window.

9. A method for improving the accuracy of a tire monitoring system used in combination with a vehicle having at least one selectively inflatable tire having a measurable characteristic of a certain value when the at least one tire is inflated, the tire monitoring system initially measuring said characteristic and producing a second value based upon said measurement, the tire monitoring system further and periodically measuring the characteristic and producing third values based upon these periodic measurements and selectively producing a tire deflation signal when at least one of the produced third values differs from the second value, the method comprising the steps of:

comparing the second value to the certain value;

providing a selectively energizable warning device;

causing the tire monitoring assembly, based upon the comparison of the second value to the certain value, to discard the second value, thereby preventing the comparison of the second value with the third values from being made; and selectively energizing the warning devices, thereby improving the accuracy of the tire monitoring system.

10. The method of claim 9 further comprising the steps of providing a selectively depressible switch; and causing said tire monitoring assembly to produce said second value when said switch is depressed.

* * * * *